Dec. 21, 1965   J. F. QUAAS ETAL   3,224,325
DEMONSTRATION PROJECTION APPARATUS
Filed Sept. 7, 1961   3 Sheets-Sheet 1

INVENTORS
Joseph F. Quaas
Guido A. dal Molin
BY Connolly and Hutz
ATTORNEYS

Dec. 21, 1965   J. F. QUAAS ETAL   3,224,325
DEMONSTRATION PROJECTION APPARATUS
Filed Sept. 7, 1961   3 Sheets-Sheet 2

INVENTORS
Joseph F. Quaas
Guido A. dal Molin
BY Connolly and Hutz
ATTORNEYS

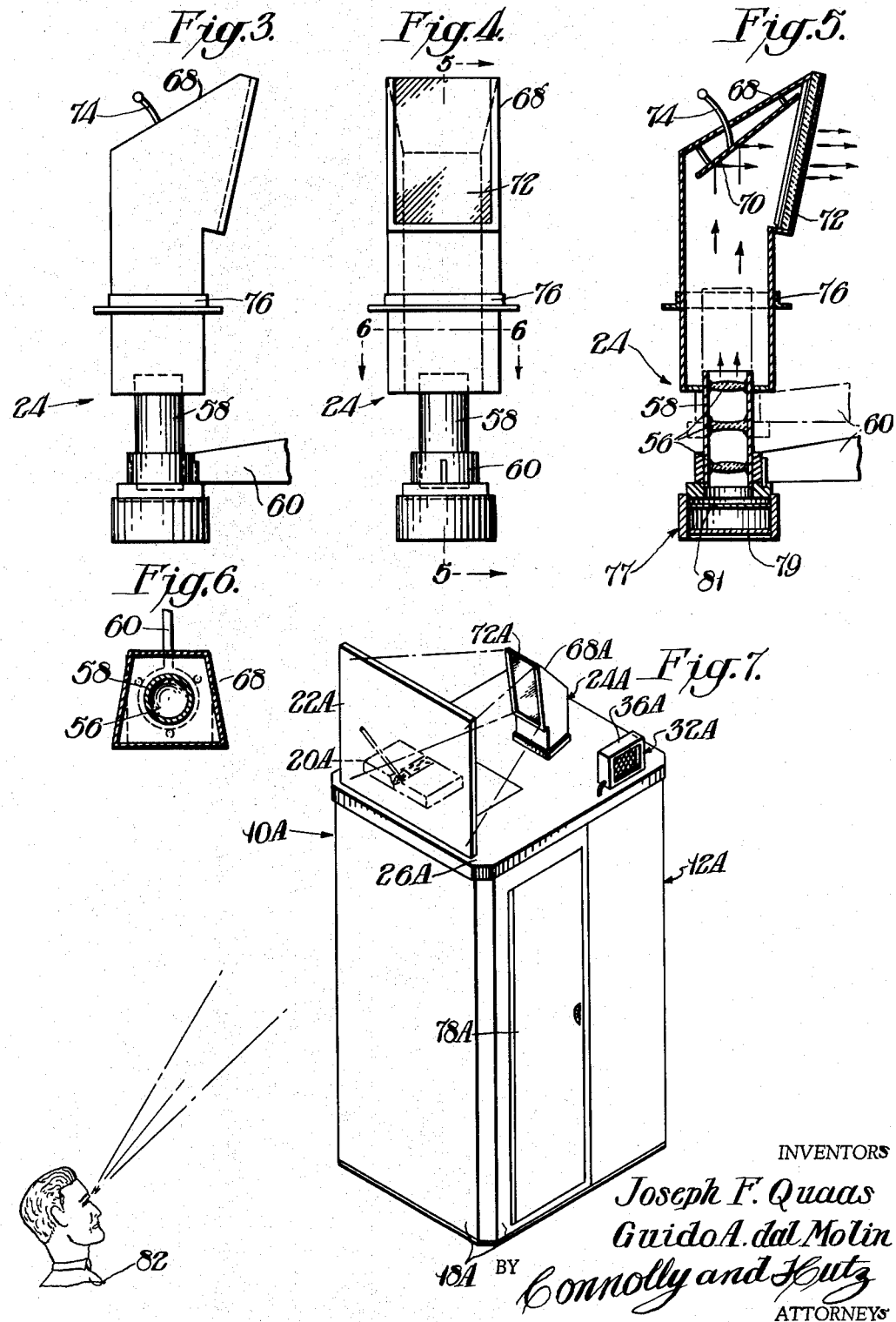

United States Patent Office 3,224,325
Patented Dec. 21, 1965

3,224,325
DEMONSTRATION PROJECTION APPARATUS
Joseph F. Quaas, Island Park, and Guido A. dal Molin, Wantagh, N.Y., assignors to Eutectic Welding Alloys Corporation, Flushing, N.Y., a corporation of New York
Filed Sept. 7, 1961, Ser. No. 136,497
10 Claims. (Cl. 88—24)

This invention relates to an apparatus for indirectly demonstrating procedures to an audience which might be dangerous or inconvenient to observe if directly viewed, and it more particularly relates to such an apparatus for demonstrating torch operations such as welding or cutting procedures.

Torch operations such as welding and cutting by either gas or arc methods are difficult to demonstate to a large audience because of the intense glare and flying sparks and particles which are evolved as well as the lack of space around the operation for accommodating more than a few direct observers who must be protected from flying sparks and glare by uncomfortable safety glasses.

An object of this invention is to provide an apparatus which permits a relatively large audience to safely and comfortably view a dangerous operation, such as one producing glare and flying sparks;

Another object is to provide such an apparatus for demonstrating torch operations such as welding and cutting; and A further object is to provide such an apparatus which is portable.

In accordance with this invention the unsafe procedure is performed by an operator within an enclosure and the audience views the operation as it is displayed on a screen outside the enclosure by a projection system extending through it. A large audience can thereby witness in absolute comfort and safety otherwise dangerous torch operations such as welding or cutting which are confined within the enclosure. A ventilating system provides a flow of fresh air to the operator, and he can describe his activities through a public address system. Furthermore the enclosure may be made easily collapsible to facilitate transportation from place to place. The projection system may incorporate filters for minimizing glare, and the darker portion of the procedure may be illuminated to also make them conveniently visible.

Novel features and advantages of the present invention will become apparent to one skilled in the art from a reading of the following description in conjunction with the accompanying drawings wherein similar reference characters refer to similar parts and in which.

FIGS. 3 and 4 are respectively side and front views in elevation of the projection system shown in FIGS. 1 and 2;

FIGS. 5 and 6 are cross sectional views taken through FIG. 4 along the lines 5—5 and 6—6; and FIG. 7 is a perspective view of a modified embodiment of this invention.

Figure 1:
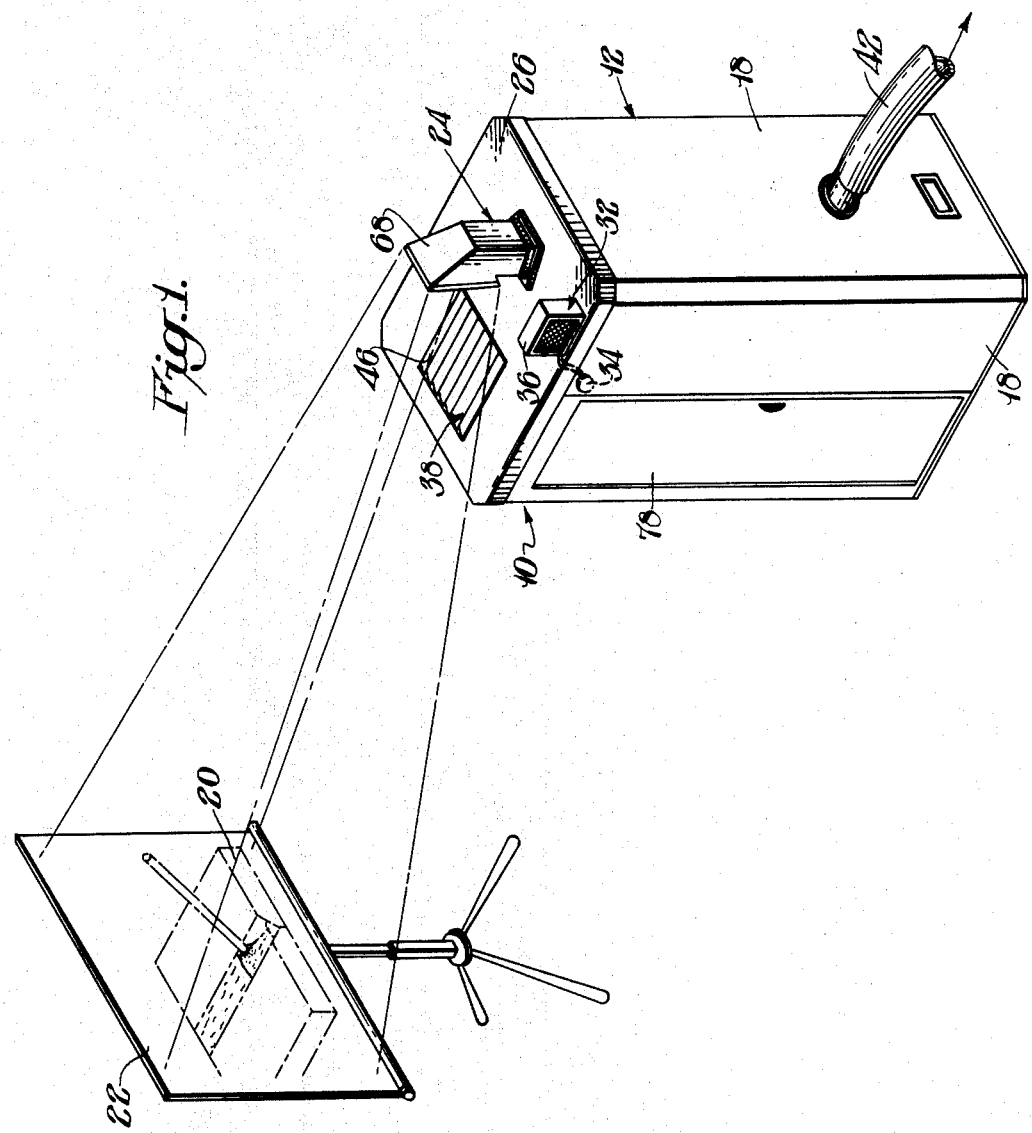
FIG. 1 is a perspective view of one embodiment of this invention in operation.
Figure 2:
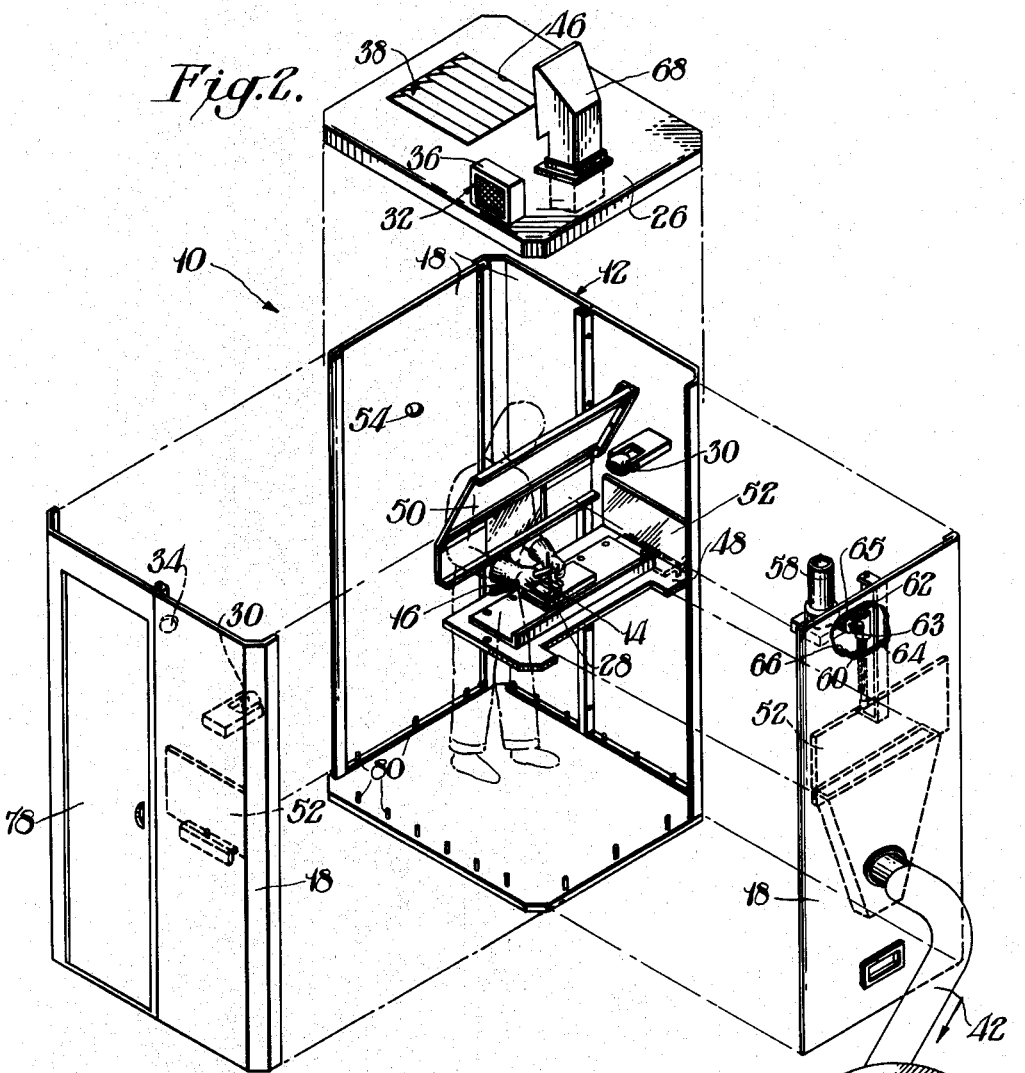
FIG. 2 is an exploded view of the enclosure portions of the embodiment shown in FIG. 1.

In FIG. 1 is shown an apparatus 10 for demonstrating torch operations such as welding and cutting procedures in safety and comfort to a relatively large audience (not shown). Apparatus 10 includes an enclosure or booth 12 within which, as shown in FIG. 2, a glare, spark and heat-producing operation such as welding being performed by operator 14 is confined. As shown in FIG. 2, the glare, sparks and heat generated by welding torch 16 within booth 12 are confined by the collapsible walls 18 of portable booth 12, and only a subdued image 20 of the procedure is projected upon screen 22 as shown in FIG. 1 by a projection system 24 which extends through roof 26 of booth 12.

Figure 2A:
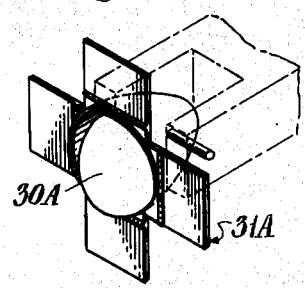
FIG. 2A is a perspective view of a lamp and reflector for use with the illustrated embodiment of this invention.
Figure 2A:
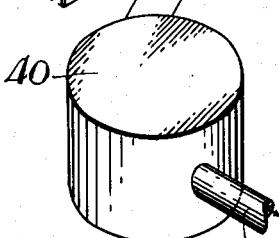

As shown in FIG. 1, the procedure of welding metal plates 28 by torch 16 within booth 12 is made clearly and comfortably visible to a rather large audience without the necessity of shielding them from glare and flying sparks by safety glasses. Furthermore, the non-inherently glare producing portions of the demonstration are illuminated by high intensity light sources, such as 32,000 center beam candle power lamps 30 operating at 625 watts. In FIG. 2A is shown a lamp 30A with adjustable reflectors 31A for finely adjusting the illumination upon the metal plates whereby the contrast between the glaring arc and darker plates may be adjusted to provide optimum viewing conditions. This auxiliary illumination makes plates 28 visible while a filter, later described, decreases the intense contrast between the arc and plates to make the operation more clearly visible. The audience can, therefore, better observe the process indirectly than they could directly in spite of the fact that they are more comfortable in doing so and much safer.

Also as shown in FIGS. 1 and 2, operator 14 may describe the procedure to an external audience through public address system 32 including microphone 34 and loudspeaker 36. Fresh air is also continuously circulated through booth 12 by ventilating system 38 including exhaust blower 40, suction piping 42 and discharge piping 44 which may be connected to the outdoors or to permanent exhaust ducts. Suction piping 42 is connected to exhaust vent 44 within booth 12 to collect heat, fumes and any particles emitted within enclosure 12 and to concurrently induce a flow of fresh air into booth 12 through louvered opening 46 in roof 26 of enclosure 12. This permits operator 14 to work in comparative comfort and safety. Operator 14 performs the operation upon a work bench 48, and he is himself shielded from sparks and glare by semitransparent shield 50 which permits him to operate it in comparative safety without the use of safety glasses. The areas of walls 18 directly surrounding bench 48 are protected by three metal shields 52, and the operator if he desires may observe what is being projected upon screen 20 by glancing through peep hole 54.

Projection system 24, as shown in detail in FIGS. 3–6, includes a projection lens 56 mounted within a tubular lens holder 58 supported upon an arm 60 adjustably secured to support rack 62 which is mounted by bracket 64 upon rear wall 66, through a pinion 63 which is rotated by motor 65 under the control of operator 14. As shown in FIGS. 3–5, lens holder 58 extends within projection head assembly 68 within which is mounted a mirror 70 for reflecting the image of the welding procedure through a protective glass 72. Mirror 70 is adjustably mounted by means of adjustable assembly 74 to permit the line of projection of the image to be controlled. Projection head 68 is suspended from roof 26 by flange 76. A shield 77 is mounted upon the bottom of lens holder 58, and it includes a plate 79 of safety glass. A dichroic filter 81 also reflects heat away from lenses 56, and reduces the intensity of the glare.

As shown in FIGS. 1 and 2, operator 14 enters booth 12 through door 78, and the entire booth 12 is easily collapsed and reassembled by means of convenient fasteners 80. This permits booth 12 to be conveniently transported and reassembled in the field. It accordingly provides a highly convenient assembly, which may be easily transported and set up wherever demonstrations are to be conducted such as at welding expositions and conventions.

In FIG. 7 is shown another embodiment 10A of this invention in which a screen 20A is directly mounted upon booth 12A, and projection system 24A projects an image upon a rear of screen 20A whose reverse image is viewed by an audience composed of persons 82 in front of booth 12A. Suitable compensation may be made to present a true image to the audience, or reversals of image may be disregarded in accordance with whether or not such reversals of image are considered critical. The apparatus shown in FIG. 7 has the advantage of consolidating all portions of the apparatus which makes it more convenient for transportation and viewing.

What is claimed is:

1. An apparatus for demonstrating a procedure emitting fumes, heat and glare comprising a booth for accommodating a person and within which said procedure is performed, a workbench disposed within said booth, said booth having walls for shielding said procedure from direct observation by persons in the vicinity outside said booth and for enclosing said fumes, heat and glare, a projection system extending into said booth and including a projection head outside of said booth, said projection system also including a screen outside of said booth upon which said procedure may be indirectly observed while it is being performed within said booth, a ventilating system connected to said booth for exhausting fumes and heat from said booth, and said ventilating system having means for conducting said fumes and heat away from said vicinity of said booth and for admitting fresh air into said booth.

2. An apparatus as set forth in claim 1 wherein said ventilating system includes an exhaust blower, suction piping means connecting said exhaust blower to said booth, discharge piping connected to said exhaust blower and fresh air inlet means mounted in the top of said booth.

3. An apparatus as set forth in claim 1 wherein said projection system incorporates a filter for projecting an image free from glare upon said screen.

4. An apparatus as set forth in claim 1 wherein said projection system enlarges the objects being projected.

5. An apparatus as set forth in claim 1 wherein said booth is made collapsible to facilitate portability.

6. An apparatus as set forth in claim 1 wherein a projection lamp is provided within said booth for illuminating portions of said procedure which are not inherently light producing.

7. An apparatus as set forth in claim 6 wherein an adjustable reflector is connected to said projection lamp.

8. An apparatus as set forth in claim 1 wherein a public address system is mounted upon and within said booth for allowing the operator within said booth to describe the procedure that he is performing to persons outside said booth.

9. An apparatus as set forth in claim 1 wherein a semi-transparent shield is provided within said booth to shield the operator from said procedure.

10. An apparatus as set forth in claim 1 wherein a viewing aperture is provided through said booth to permit said operator within it to observe said procedure as it is projected upon said screen.

References Cited by the Examiner

UNITED STATES PATENTS

| | | | |
|---|---|---|---|
| 1,929,508 | 10/1933 | Meyer et al. | 95—92 |
| 2,066,158 | 12/1936 | Patterson | 88—24 |
| 2,095,456 | 10/1937 | Smellie | 88—24 |
| 2,215,396 | 9/1940 | Hoyt. | |
| 2,464,887 | 3/1949 | Osterberg et al. | 88—24 |
| 2,557,046 | 6/1951 | Evans | 88—24 |
| 2,824,490 | 2/1958 | Fitzgerald | 88—24 |

FOREIGN PATENTS

| | | |
|---|---|---|
| 353,880 | 7/1905 | France. |
| 668,314 | 7/1929 | France. |
| 849,262 | 8/1939 | France. |
| 487,281 | 12/1929 | Germany. |

LEO SMILOW, *Primary Examiner.*

EMIL G. ANDERSON, *Examiner.*